US 6,625,168 B1

United States Patent
Langer et al.

(10) Patent No.: US 6,625,168 B1
(45) Date of Patent: Sep. 23, 2003

(54) SYSTEM AND METHOD FOR CONTROLLING AND MONITORING FIRST TELECOMMUNICATION TERMINAL DEVICES CONNECTED TO PRIVATE BRANCH EXCHANGES OR SECOND TELECOMMUNICATION TERMINAL DEVICES COUPLED TO LONG DISTANCE NETWORKS

(75) Inventors: Uwe Langer, Paderborn (DE); Dirk Riesenbeck, Bad (DE); Frank Schindel, Paderborn (DE); Erwin Tanger, Delbrueck (DE); Rainer Zimmermann, Paderborn (DE)

(73) Assignee: Siemens Aktiengesellschaft, Munich (DE)

( * ) Notice: Subject to any disclaimer, the term of this patent is extended or adjusted under 35 U.S.C. 154(b) by 402 days.

(21) Appl. No.: 09/676,242

(22) Filed: Sep. 29, 2000

(30) Foreign Application Priority Data

Sep. 30, 1999 (DE) .......................................... 199 47 032

(51) Int. Cl.[7] .................................................. H04J 3/16
(52) U.S. Cl. .................... 370/466; 370/469; 379/142.14
(58) Field of Search ........................ 370/230, 351–360, 370/389, 400–1, 466–469; 379/219, 220.01, 225, 229, 231–4, 242, 308, 310, 1.01, 9, 9.01, 9.02, 32.01, 114.01, 142.07, 142.13, 142.14

(56) References Cited

U.S. PATENT DOCUMENTS

| | | | | | |
|---|---|---|---|---|---|
| 4,332,982 | A | * | 6/1982 | Thomas | 379/200 |
| 5,799,072 | A | * | 8/1998 | Vulcan et al. | 379/114.02 |
| 5,995,607 | A | * | 11/1999 | Beyda et al. | 379/202.01 |
| 6,396,918 | B1 | * | 5/2002 | King et al. | 379/211.02 |
| 6,442,169 | B1 | * | 8/2002 | Lewis | 370/401 |
| 6,452,915 | B1 | * | 9/2002 | Jorgensen | 370/338 |

* cited by examiner

Primary Examiner—David Vincent
(74) Attorney, Agent, or Firm—Staas & Halsey LLP

(57) ABSTRACT

In a system for controlling and monitoring first telecommunication terminal devices coupled to private branch exchanges or second telecommunication terminal devices coupled to long-distance networks, at least one application-related conversion unit is provided together with at least one control information router and protocol conversion unit. The application-related conversion units are used for protocol conversion of data supplied by application programs to a uniform system-internal data format. The function of the control information routers is the reception and forwarding of commands and messages. The protocol conversion units are provided for the conversion of the uniform system-internal data format to domain-specific communication protocols.

15 Claims, 4 Drawing Sheets

SYSTEM AND METHOD FOR CONTROLLING AND MONITORING FIRST TELECOMMUNICATION TERMINAL DEVICES CONNECTED TO PRIVATE BRANCH EXCHANGES OR SECOND TELECOMMUNICATION TERMINAL DEVICES COUPLED TO LONG DISTANCE NETWORKS

BACKGROUND OF THE INVENTION

In many cases, telecommunication terminal devices connected to a private branch exchange of a communication system are controlled and monitored from a computer. For this purpose, suitable interfaces between, on the one hand, private branch exchanges and telecommunication terminal devices and, on the other hand, private branch exchanges and computer devices are already defined. It is standard practice that private branch exchanges are controlled separately via a CTI (Computer Telephone Integration) link, using the CSTA (Computer Supported Telephone Application) protocol. However, such control possibilities are not available for a plurality of applications simultaneously.

Comparable control possibilities also exist in newer multimedia terminal devices that are coupled to long-distance networks, for example Intranet or Internet. Multimedia terminal devices belonging to a defined set (domain) can be controlled and monitored by a suitable computer. However, up to now a separate control unit has had to be implemented in multimedia devices for each type of application.

Up to now there have existed no integrated solutions permitting a common controlling and monitoring both of terminal devices connected to private branch exchanges and also of terminal devices coupled to long-distance networks. Due to the increasing importance of the transmission of time-critical data, particularly speech data and multimedia data, using TCP/IP, in heterogeneous communication networks the need has arisen for control and monitoring possibilities of this sort for telecommunication terminal devices.

SUMMARY OF THE INVENTION

It is an object of the invention to create a system that permits the controlling and monitoring of telecommunication terminal devices connected to private branch exchanges of communication system or of telecommunication terminal devices coupled to long-distance networks.

According to the system and method of the invention for controlling and monitoring first telecommunication terminal devices connected to private branch exchanges or second communication terminal devices coupled to long-distance networks, at least one application-related conversion unit is provided for protocol conversion of data supplied by application programs to a uniform system-internal data format. At least one control information router has a first reception unit for receiving commands from an application-related conversion unit as well as the forwarding thereof via a protocol conversion unit to terminal devices logically allocated to one another and that form a domain, and a second reception unit for receiving messages from a domain as well as the forwarding thereof via a protocol conversion unit to an application-related conversion unit. The protocol conversion units are provided for conversion of the uniform system-internal data format to domain-specific communication protocols. First ones of the protocol conversion units are coupled to private branch exchanges. Second ones of the protocol conversion units are coupled to long-distance networks. The second protocol conversion units comprise a protocol setup unit for supplementing structural items of additional information in the system-internal data format, a coupling unit to a central monitoring and connection signaling unit of a domain inside a long-distance network, and a management unit for acquisition of registered terminal devices of long-distance networks.

The inventive solution ensures a plurality of networks to the extent that a plurality of private branch exchanges and a plurality of domains can be controlled simultaneously within one long-distance network.

An advantage of the inventive solution is that applications running on a computer can use a variety of application programming interfaces for controlling and monitoring. The controlling and monitoring functions are thereby simultaneously available for a variety of applications. The basis for this is the introduction of a uniform system-internal data format, to the model of which the various application programming interfaces are adapted. Moreover, the applications can access various network types in a uniform fashion. This is achieved by adapting the various domain-specific protocols (e.g. ACL, CSTA, H.323) to the system-internal data format. Using the control information router, an access to telecommunication terminal devices that overlaps network boundaries is enabled.

In a preferred construction, the protocol conversion means additionally include controllers unit that are provided as a security feature for the monitoring of user-specific authorizations for the execution of control commands and monitoring commands.

The uniform system-internal data format is preferably based on the CSTA-III protocol. In addition, the first protocol conversion units are provided with converters to the ACL protocol or to the CSTA protocol, while the second protocol conversion units preferably comprise converters to the H.323 protocol. In some cases of application, it is advantageous to carry out a conversion to an ATM protocol instead of the H.323 protocol.

The telecommunication terminal devices coupled to long-distance networks are preferably based on computers. This enables the controlling and monitoring of multimedia terminal devices via wide area networks, Intranet, or via the Internet. A relief of the burden on the instances of the adaptation layer can be achieved if the telecommunication terminal devices coupled to long-distance networks are provided with their own application-related conversion means. Similarly, a relief of the burden on the network layer can be realized by equipping telecommunication terminal devices coupled to long-distance networks with their own control information routers. This offers decisive advantages particularly in the transmission of time-critical data, in particular multimedia data.

Converters of the uniform system-internal data format to the H.323 protocol are preferably arranged in a separate terminal device control unit. This terminal device control unit comprises an additional signaling auxiliary unit that controls the flow of data from and to the telecommunication terminal device. The advantage of such a design is particularly, in time-critical cases of application, in the relief of the allocated protocol conversion unit. Moreover, in this context it is useful that the second protocol conversion unit comprise for its part an additional unit for controlling the data connection to the terminal device control units.

A particularly efficient forwarding of information can be achieved by equipping the control information routers with a registration unit for the application-related conversion unit and with a registration unit for the protocol conversion unit. In this way, communication with remote entities on the network layer is accelerated, and the localization of suitable protocol conversion unit is simplified.

In the following, the invention is explained in more detail on the basis of exemplary embodiments, with reference to the drawings

DESCRIPTION OF THE PREFERRED EMBODIMENTS

Figure 1:
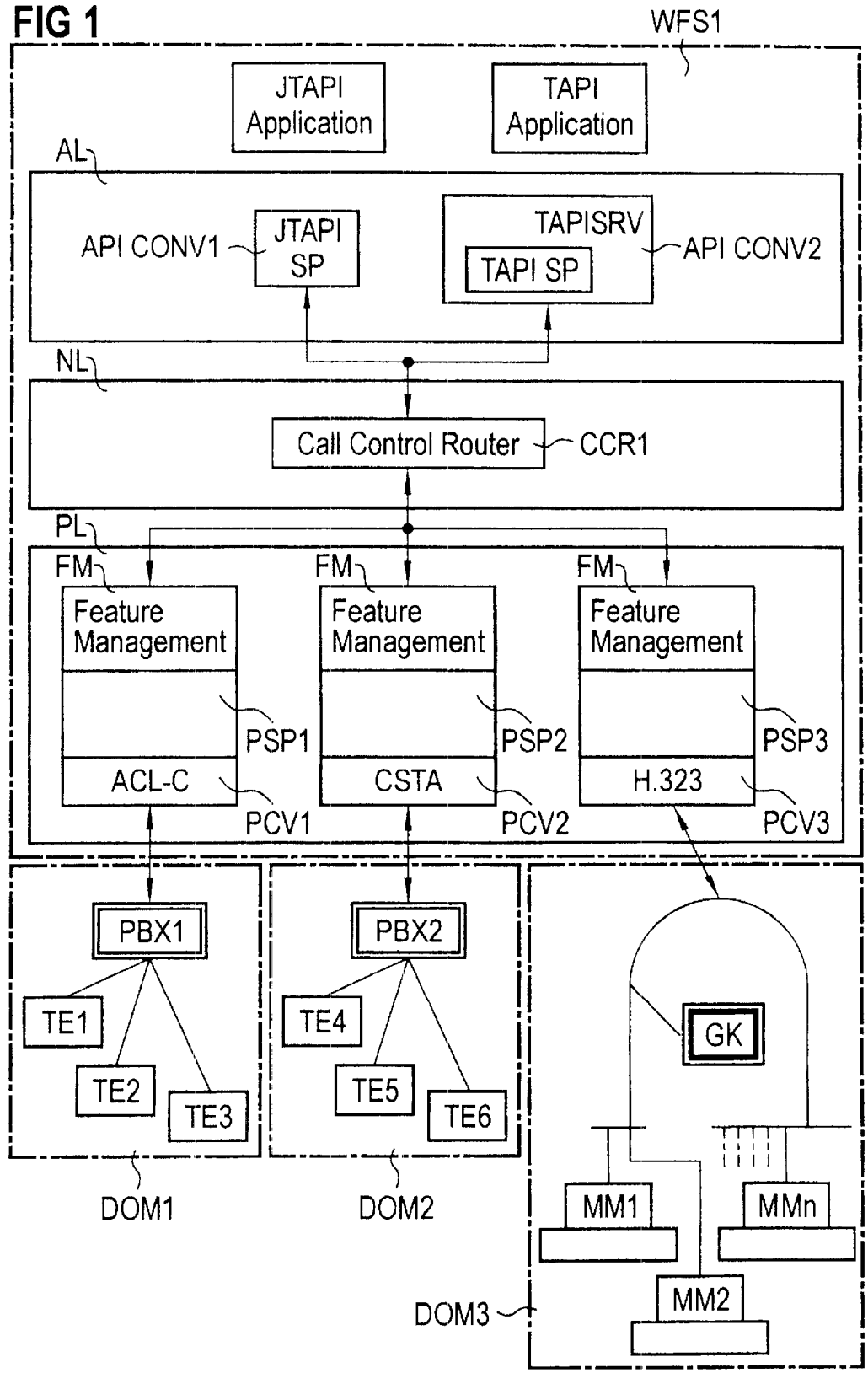
FIG. 1 shows the basic structure of an inventive system.

In FIG. 1, the design of an inventive system for controlling and monitoring telecommunication terminal devices and the coupling of its components is illustrated. For better understanding, the system can be divided into three layers.

A plurality of application-related conversion units API CONV1 and API CONV2 (API CONVerter) are allocated to an application plane AL (Application Layer), those units enabling a conversion of data supplied by application programs into a uniform system-internal data format. Conversion units of this sort are for example realized for JTAPI or TAPI applications under Windows NT. The system-internal data format is based on the CSTA-III protocol, which provides internal communication objects, such as calls, devices, and connections.

At least one control information router CCR1 (Call Control Router) is provided on a network layer NL (Network Layer), which is allocated to a server WFS1 (WorkFlow Server), from which control commands or monitoring commands are dispatched. Control information or call control router CCR1 is used to accept commands from application layer AL and to decide in which domain DOM1, DOM2, or DOM3 the respective command is to be executed. An additional function is in the reception of messages from a domain DOM1, DOM2, or DOM3 and the forwarding of these messages to a suitable entity API CONV1 or API CONV2 of application layer AL. Besides the reception and the forwarding of commands and messages, the control information router also receives switching installation tasks from various domains for setting up a call connection between terminal devices.

Figure 3:
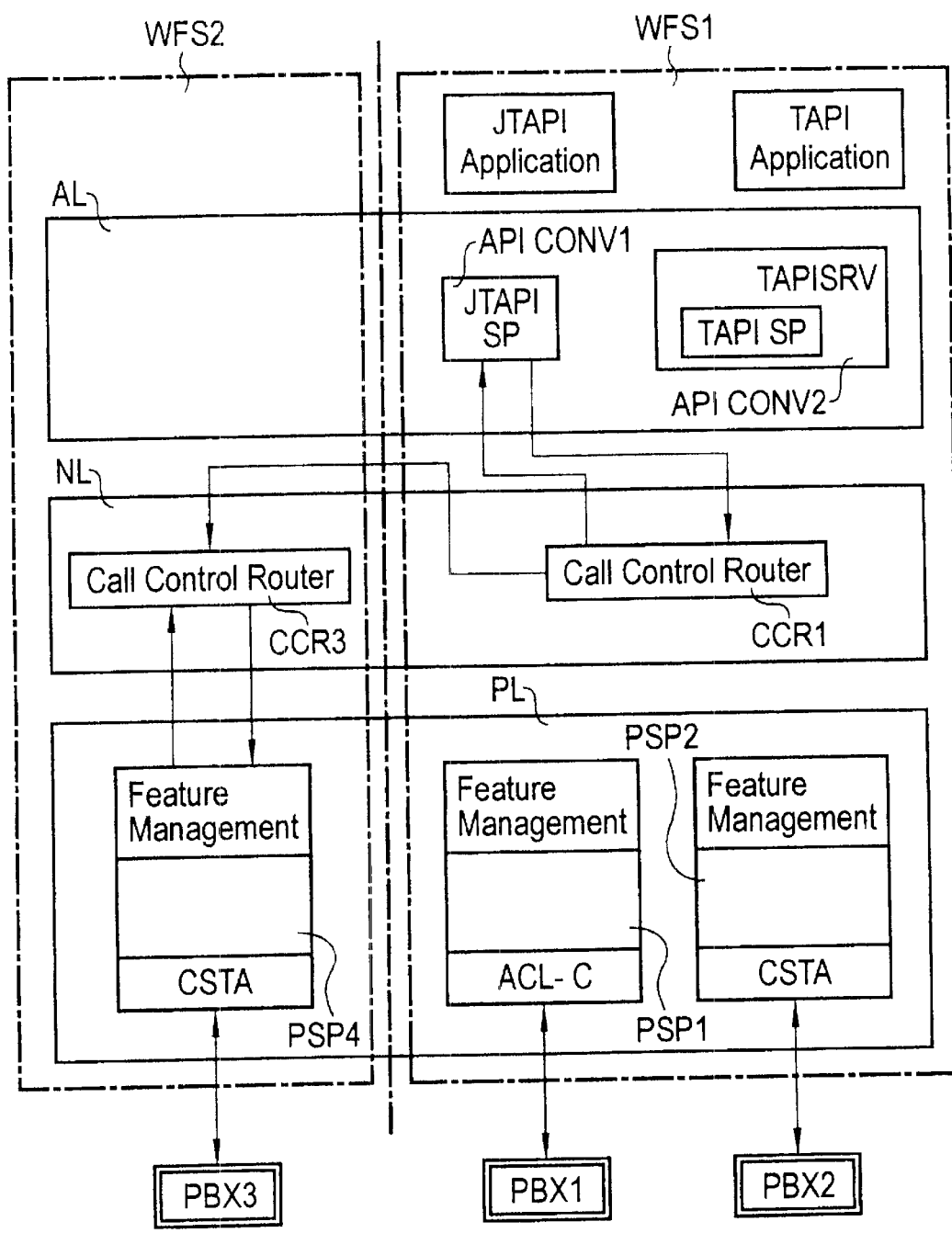
FIG. 3 shows a schematic representation of the signal flow during the transmission of a control or monitoring command from an application running on a computer to a private branch exchange that is allocated to a remote control information router.
Figure 4:
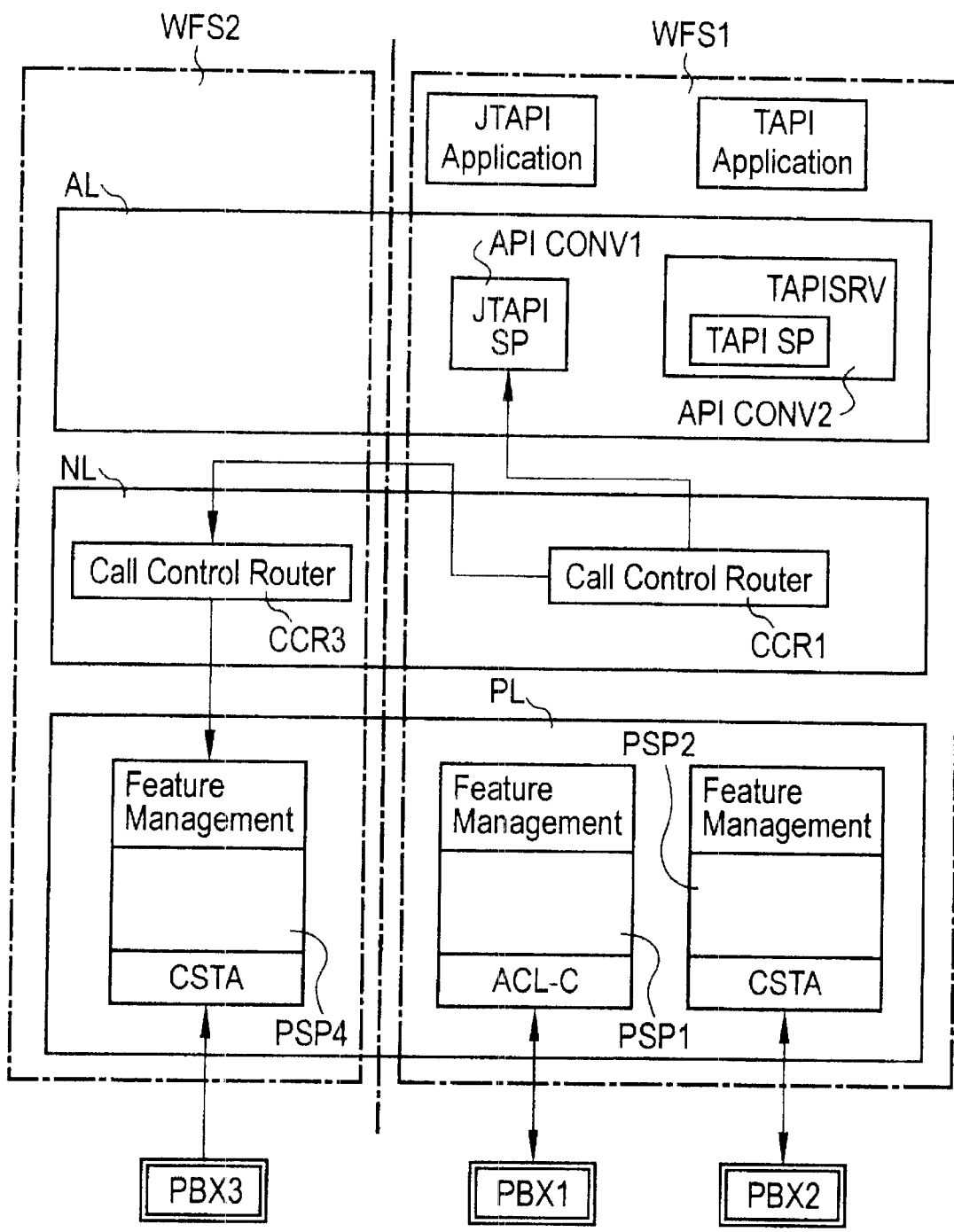
FIG. 4 shows a schematic representation of the signal flow during the transmission of an event message from a private branch exchange to an application running on a computer.

Control information or call control routers CCR1, CCR3 on different servers WFS1, WFS2 communicate with one another via permanently set-up connections (see FIGS. 3 and 4). If necessary, commands from a local application-related conversion units must thereby be transmitted by a local control information router CCR1 to a remote control information router CCR3.

On a protocol layer, protocol conversion unit PSP1, PSP2, PSP3 (Protocol Service Provider) are available that carry out the conversion of the system-internal data format to domain-specific communication protocols PCV1, PCV2, PCV3 (ACL, CSTA, H.323) (FIG. 1). In addition, protocol conversion units, PSP1, PSP2, PSP3 have the function of checking user-specific authorizations for the execution of control and monitoring commands. These checks take place in a special control units FM (Feature Management). Two different types of protocol conversion units are to be distinguished. First protocol conversion units PSP1, PSP2 are used for controlling and monitoring telecommunication terminal devices TE1–TE6 connected to private branch exchanges PBX1, PBX2. Such protocol conversion means PSP1, PSP2 are provided with a unit for setting up communication connections between server WFS1 and private branch exchanges PBX1, PBX2, all telecommunication terminal devices connected to a common private branch exchange being allocated to one and the same domain. Private branch exchanges PBX1, PBX2 are controlled via an ACL protocol or a CSTA protocol. In the latter case, there results a particularly low expense for the realization of converters, because the system-internal model is already based on the CSTA-III protocol.

Second protocol conversion units support the controlling and monitoring of telecommunication terminal devices coupled to long-distance networks. In the present case, telecommunication terminal devices MM1–MMn coupled to a long-distance network WAN are multimedia terminals. Multimedia terminals MM1–MMn are coupled, within a domain DOM3 of long-distance network WAN, with a central monitoring and connection signaling unit GK—the gatekeeper—which registers, at each point in time, all registered multimedia terminals MM1–MMn and the IP addresses thereof.

Figure 2:
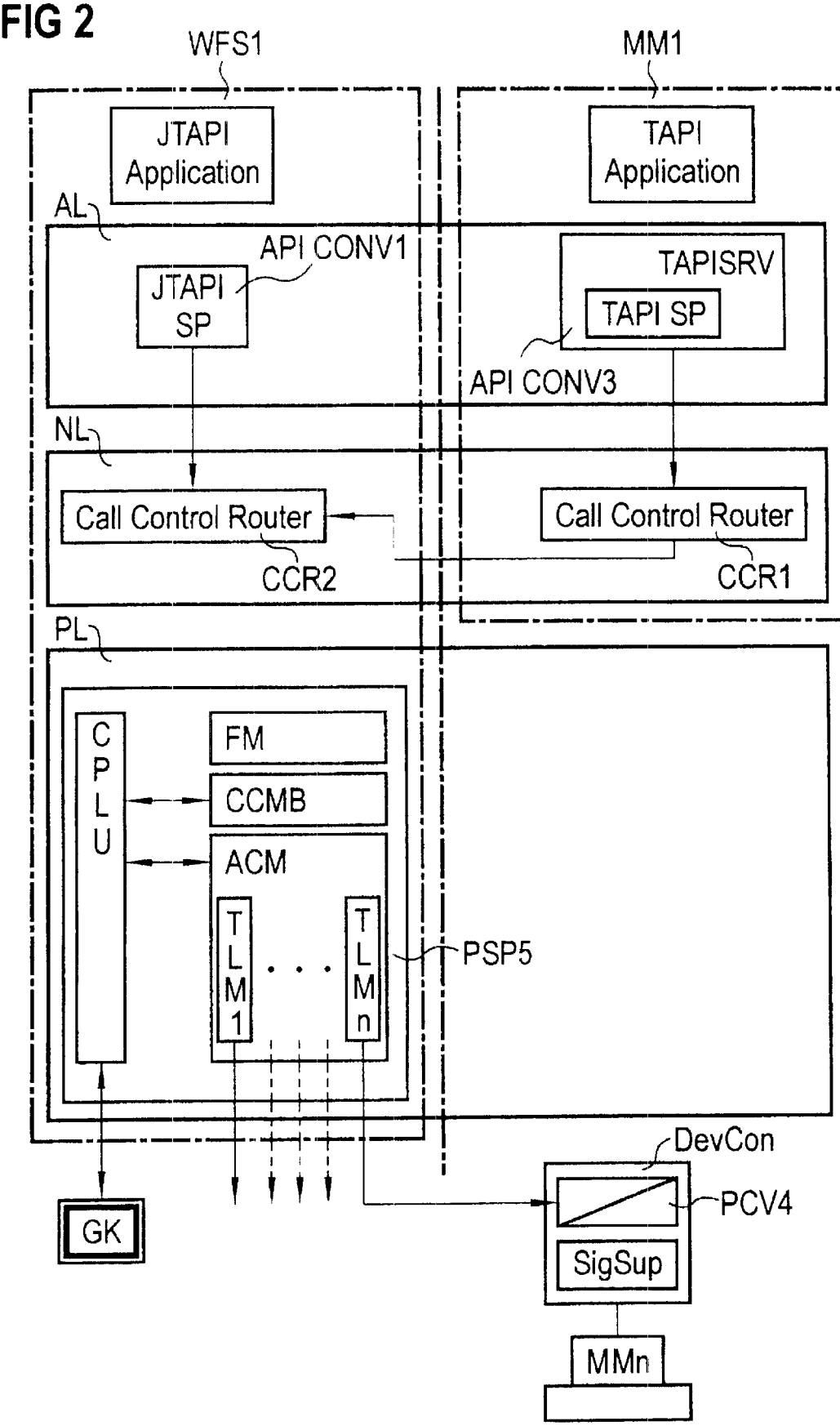
FIG. 2 shows a realization of the second protocol conversion unit that is used for controlling and monitoring telecommunication terminal devices coupled to long-distance networks.

The function of a second protocol conversion unit PSP3 involves additionally the setting up of data connections and the supplementing of structural items of additional information in the system-internal data format. A protocol setup unit CCMB (Call Control Model Builder), shown in FIG. 2, is required for the supplementing of the structural items of additional information, since the H.323 protocol, used in the relevant long-distance network WAN, does not for example have its own control protocol. This means that particular communication objects must be set up by the second protocol conversion unit.

As can be seen in FIG. 2, second protocol conversion unit are provided with a coupling unit CPLU (CouPLing Unit) to gatekeeper GK. The coupling unit CPLU thereby represents the connecting element between gatekeeper GK and a management unit ACM (Active Client Manager) for the acquisition of registered multimedia terminals. The information concerning which multimedia terminals in the H.323 domain are registered can either be requested at gatekeeper GK or is communicated through gatekeeper GK during login or logout processes. In the exemplary embodiment shown in FIG. 2, the conversion from the system-internal data format to the domain-specific communication protocol H.323 takes place in a terminal device control unit DevCon (Device Control) for a fixedly allocated multimedia terminal MMn. Moreover, terminal device control unit DevCon has a signaling auxiliary device SigSup (Signalizing Support Unit), which, working together with a control unit TLMn contained in protocol conversion unit PSP5, controls the data connection between terminal device control unit DevCon and protocol layer PL.

The execution of control and monitoring commands is also possible from a multimedia terminal MM1. For this purpose, however, multimedia terminal MM1 must be provided with its own application-related conversion unit API CONV3 and with its own control information router CCR2. As indicated in FIG. 2, the controlling of another multimedia terminal MMn is possible therewith. For this purpose, a control information router CCR2, allocated to controlling multimedia terminal MM1, receives a command from application layer AL and communicates this command to an additional control information router CCR1 on the network layer NL, which router selects and controls a suitable protocol conversion unit PSP3.

FIG. 3 illustrates the signal flow and the activities during the sending of a control or monitoring command from an application running on a first server WFS1 to a private branch exchange PBX3 controlled by a remote second server WFS2. First, the application-related conversion unit API CONV1, API CONV2 are registered on the first server WFS1 by control information router CCR1. In this way, a data connection is set up between first control information router CCR1 and a first application-related conversion unit API CONV1. On the basis of this, a service request can be dispatched from application layer AL. This service request is received by first control information router CCR1 via the set-up data connection. The service request is evaluated by first control information router CCR1 and is forwarded to a suitable second control information router CCR3 that is allocated to second server WFS2. In addition, first control information router CCR1 allocates the service request to the calling application for later tracing.

A data connection is set up between the first and second control information router for the exchange of the service request, via which connection the service request is communicated to second control information router CCR3. Second control information router CCR3 carries out an evaluation of the service request in order to select a suitable protocol conversion unit PSP4 to which the service request is to be forwarded. In addition, second control information router CCR3 logically allocates the service request to the first control information router CCR1, since the service request was communicated from this router. This is likewise used for the later tracing of the service request.

The service request is now forwarded from second control information router CCR3 to selected protocol conversion unit PSP4. In protocol conversion unit PSP4 there first takes place a check as to whether the service request is to be executed or rejected. There subsequently takes place a conversion of the service request into a domain-protocol-specific message. The message is then forwarded to a selected private branch exchange PBX3, whereupon private branch exchange PBX3 reacts with a response message, sent to allocated protocol conversion unit PSP4. This protocol conversion units PSP4 converts the response to the system-internal data format. Subsequently, the converted response is sent to second control information router CCR3.

With the aid of the tracing information stored in second control information router CCR3, first control information router CCR1 is determined as the entity on network layer NL from which the service request originated. The response is now sent from second control information router CCR3 to first control information router CCR1. There, with the aid of the previously executed allocation of the service request to the calling application, the tracing of the calling application takes place. Finally, the response is sent from first control information router CCR1 to the determined application.

At the start of a monitoring task, particular care is to be taken that only one monitoring task may be started per telecommunication terminal device. This means that from time to time a monitoring request may not be forwarded from the control information router to the private branch exchange, if another monitoring task is already active. However, a modification of the parameters of the existing monitoring task can be carried out. The same holds correspondingly for the termination of a monitoring task.

FIG. 4 illustrates the transmission of an event message from a private branch exchange PBX3 to an application. Private branch exchange PBX3 first sends the coded event message to second server WFS2. Protocol conversion unit PSP4 on second server WFS2 receives and decodes the event message. Protocol conversion unit PSP4 thereupon generates an internal event, and supplies the information concerning this event to second control information router CCR3. In some cases, it can happen that several copies of the event message must be sent to different control information routers. The event message is subsequently evaluated by second control information router CCR3. As a result of this evaluation, the event communication is forwarded to first control information router CCR1. Finally, the event message is allocated to a suitable application by first control information router CCR1, and is transmitted to this application.

Although various minor modifications might be suggested by those skilled in the art, it should be understood that our wish to embody within the scope of the patent warranted hereon all such modifications as reasonably and properly come with the scope of our contribution to the art.

What is claimed is:

1. A system for controlling and monitoring first telecommunication terminal devices connected to private branch exchanges or second telecommunication terminal devices coupled to long-distance networks, comprising:
   at least one application-related conversion unit for protocol conversion of data supplied by application programs to a uniform system-internal data format;
   at least one control information router having a first reception unit for receiving commands from an application-related conversion unit as well as the forwarding thereof via a protocol conversion unit to terminal devices logically allocated to one another and that form a domain;
   a second reception unit for receiving messages from a domain as well as the forwarding thereof via a protocol conversion unit to an application-related conversion unit;
   the protocol conversion units being provided for conversion of the uniform system-internal data format to domain-specific communication protocols;
   first ones of said protocol conversion units being coupled to private branch exchanges;
   second ones of said protocol conversion units being coupled to long-distance networks; and
   the second protocol conversion units comprising a protocol setup unit for supplementing structural items of additional information in the system-internal data format, a coupling unit to a central monitoring and connection signaling unit of a domain inside a long-distance network, and a management unit for acquisition of registered terminal devices of the long-distance networks.

2. The system according to claim 1 wherein the protocol conversion units comprise a control unit for checking user-specific authorizations for execution of control and monitoring commands.

3. The system according to claim 1 wherein the first protocol conversion units comprise communication units for setting up communication connections between computers and private branch exchanges.

4. The system according to claim 1 wherein the second protocol conversion units comprise communication units for setting up data connections.

5. The system according to claim 1 wherein the uniform system-internal data format is based on a CSTA-III protocol.

6. The system according to claim 1 wherein the first protocol conversion units have converters from the uniform system-internal data format to a CSTA protocol.

7. The system according to claim 1 wherein the first protocol conversion units have converters from the uniform system-internal data format to an ACL protocol.

8. The system according to claim 1 wherein the second protocol conversion units have converters from the uniform system-internal data format to an H.323 protocol.

9. The system according to claim 8 wherein the converters of the second protocol conversion units together with an additional signaling auxiliary unit are arranged in a separate terminal device control unit.

10. The system according to claim 1 wherein the terminal devices coupled to long-distance networks are based on computers.

11. The system according to claim 10 wherein the terminal devices coupled to long-distance networks are provided with their own application-related conversion units.

12. The system according to claim 10 wherein the terminal devices coupled to long-distance networks are provided with their own control information routers.

13. The system according to claim 1 wherein the control information routers have registration units for the application-related conversion units.

14. The system according to claim 1 wherein the control information routers have registration units for the protocol conversion units.

15. A method for controlling and monitoring first telecommunication terminal devices connected to private branch exchanges or second telecommunication terminal devices coupled to long-distance networks, comprising the steps of:

providing at least one application-related conversion unit for protocol conversion of data supplied by application programs to a uniform system-internal data format;

providing at least one control information router having a first reception unit for receiving commands from an application-related conversion unit as well as the forwarding thereof via a protocol conversion unit to terminal devices logically allocated to one another and that form a domain, and a second reception unit for receiving messages from a domain as well as the forwarding thereof via a protocol conversion unit to an application-related conversion unit;

with the protocol conversion units, converting the uniform system-internal data format to domain-specific communication protocols;

coupling first ones of said protocol conversion units to private branch exchanges;

coupling second ones of said protocol conversion units to long-distance networks; and providing the second protocol conversion units with a protocol setup unit for supplementing structural items of additional information in the system-internal data format, a coupling unit to a central monitoring and connection signaling unit of a domain inside a long-distance network, and a management unit for acquisition of registered terminal devices of the long-distance networks.

* * * * *